United States Patent
Park et al.

(10) Patent No.: US 8,222,761 B2
(45) Date of Patent: Jul. 17, 2012

(54) POWER GENERATION SYSTEM USING HELICAL TURBINE

(75) Inventors: Jin-Soon Park, Gyeonggi-do (KR); Ki-Dai Yum, Seoul (KR); Kwang-Soo Lee, Seoul (KR); Sok-Kuh Kang, Gyeonggi-do (KR); Jae-Youll Jin, Gyeonggi-do (KR); Woo-Sun Park, Seoul (KR)

(73) Assignee: Korea Ocean Research And Development Institute, Ansan, Gyeonggi-do (KR)

( * ) Notice: Subject to any disclaimer, the term of this patent is extended or adjusted under 35 U.S.C. 154(b) by 513 days.

(21) Appl. No.: 12/516,663

(22) PCT Filed: Nov. 27, 2007

(86) PCT No.: PCT/KR2007/006036
§ 371 (c)(1),
(2), (4) Date: Aug. 4, 2009

(87) PCT Pub. No.: WO2008/066312
PCT Pub. Date: Jun. 5, 2008

(65) Prior Publication Data
US 2010/0066091 A1   Mar. 18, 2010

(30) Foreign Application Priority Data

Nov. 28, 2006 (KR) .................. 10-2006-0118645

(51) Int. Cl.
*F03D 9/00* (2006.01)
*F03B 13/00* (2006.01)
(52) U.S. Cl. .......................... 290/54; 290/44
(58) Field of Classification Search .............. 290/43, 290/44, 54, 55
See application file for complete search history.

(56) References Cited

U.S. PATENT DOCUMENTS

| 1,123,491 | A | * | 1/1915 | Corbin | 290/54 |
| 3,050,007 | A | * | 8/1962 | Rydz | 415/69 |
| 4,236,866 | A | * | 12/1980 | Zapata Martinez | 415/4.4 |
| 4,524,285 | A | * | 6/1985 | Rauch | 290/43 |
| 4,659,940 | A | * | 4/1987 | Shepard | 290/55 |
| 5,642,984 | A | * | 7/1997 | Gorlov | 416/176 |

(Continued)

FOREIGN PATENT DOCUMENTS

CN        2526525 Y    12/2002

(Continued)

OTHER PUBLICATIONS

Office Action from Canadian Intellectual Property Office for Canadian Application No. 2,671,024 mailed Sep. 19, 2011.

(Continued)

*Primary Examiner* — Julio Gonzalez
(74) *Attorney, Agent, or Firm* — Edwards Wildman Palmer LLP

(57) ABSTRACT

Disclosed is a helical turbine power generation system for generating electricity by using a helical turbine and a synchronous generator, the system including: a helical turbine rotatably provided in a frame so as to continuously generate rotation force under unidirectional or multidirectional fluid flow; a step-up gear for increasing a rotational velocity of the helical turbine up to a level required for generating electricity; a fluid coupling for preventing the rotational velocity increased by the step-up gear from increasing above a required velocity at a temporarily high rate of fluid flow; and a synchronous generator for generating electricity by using the rotational velocity transferred from the fluid coupling. Therefore, it is possible to reduce equipment costs and to prevent environmental pollution.

5 Claims, 4 Drawing Sheets

U.S. PATENT DOCUMENTS

| | | | |
|---|---|---|---|
| 7,511,385 B2 * | 3/2009 | Jones et al. | 290/43 |
| 7,629,705 B2 * | 12/2009 | Barker et al. | 290/55 |
| 2004/0061337 A1 | 4/2004 | Becker | |
| 2007/0007769 A1 * | 1/2007 | Basteck | 290/1 C |
| 2008/0315591 A1 * | 12/2008 | Hamann | 290/54 |
| 2009/0085354 A1 * | 4/2009 | Tan et al. | 290/44 |

FOREIGN PATENT DOCUMENTS

| | | |
|---|---|---|
| JP | S54-106741 | 8/1979 |
| JP | H1-118164 | 8/1989 |
| KR | 10-2004-0107166 A | 12/2004 |
| KR | 10-2004-0107916 A | 12/2004 |
| KR | 10-2006-0014267 A | 2/2006 |
| WO | 96-38667 A1 | 12/1996 |
| WO | 2004-088132 A1 | 10/2004 |

OTHER PUBLICATIONS

Office Action for Chinese Applicaiton No. 200780043673.3, issued Feb. 1, 2011, which is counterpart to U.S. Appl. No. 12/516,663.
International Search Report for PCT/KR2007/006036, mailed Mar. 10, 2008.

* cited by examiner

[Fig. 1]
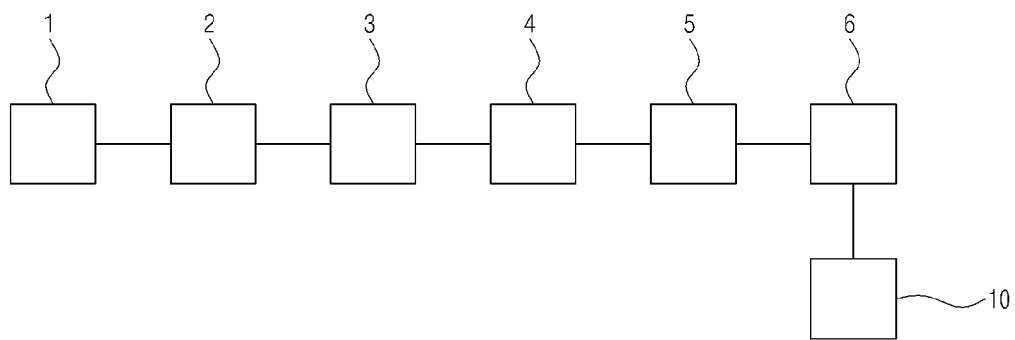
[Fig. 2]
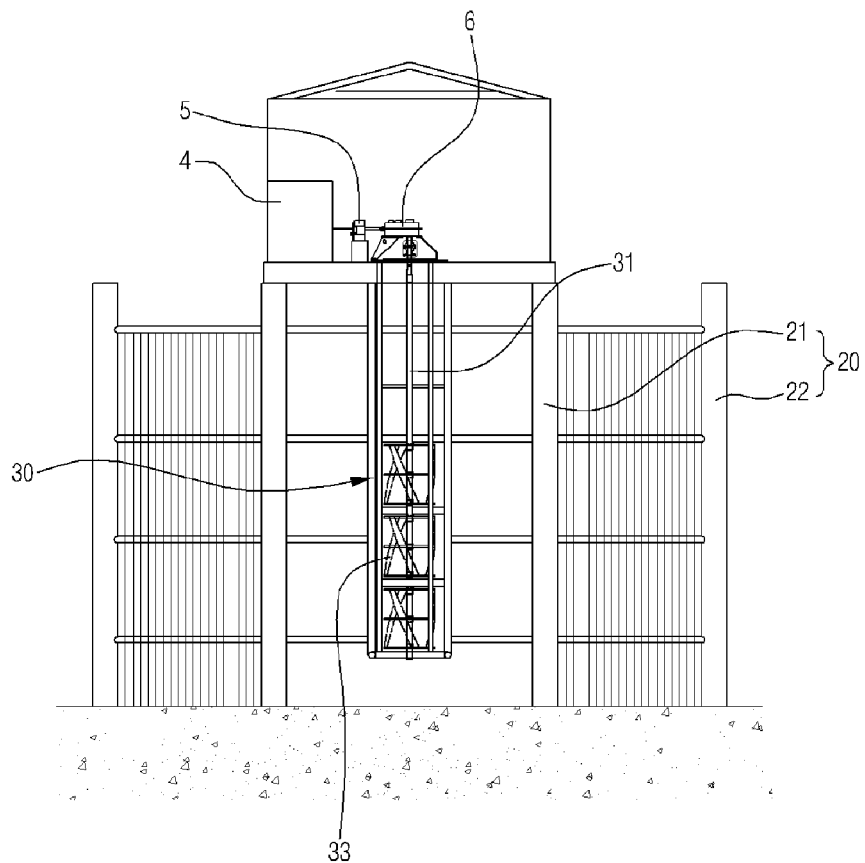

[Fig. 3]
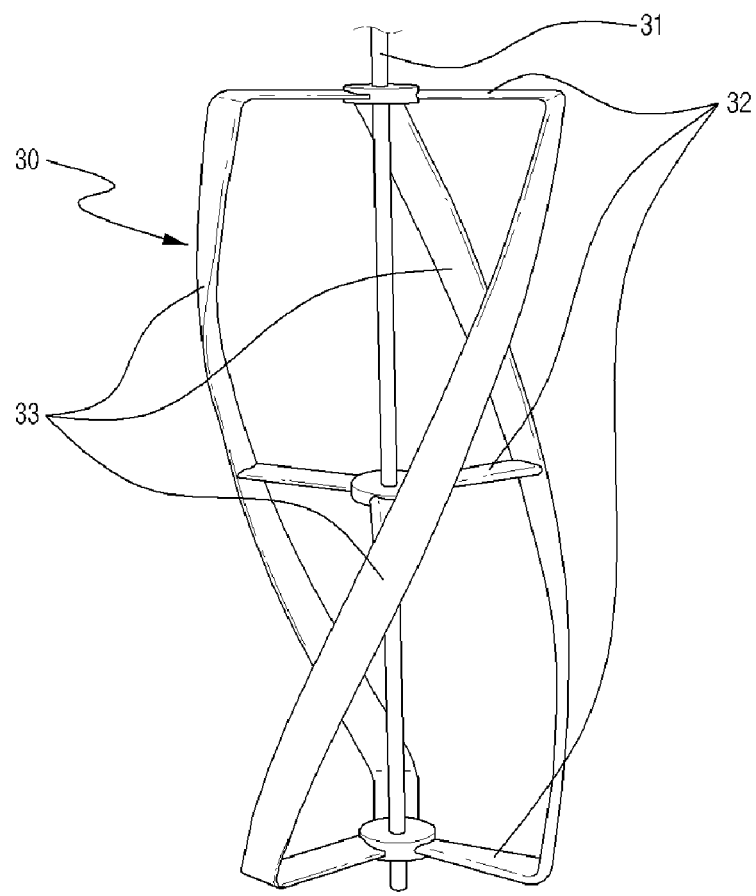
[Fig. 4]
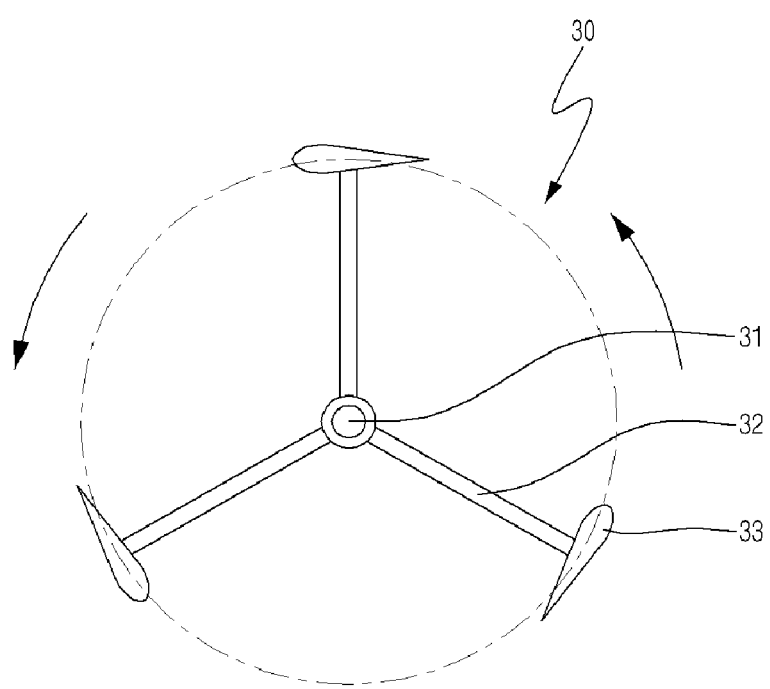

[Fig. 5]
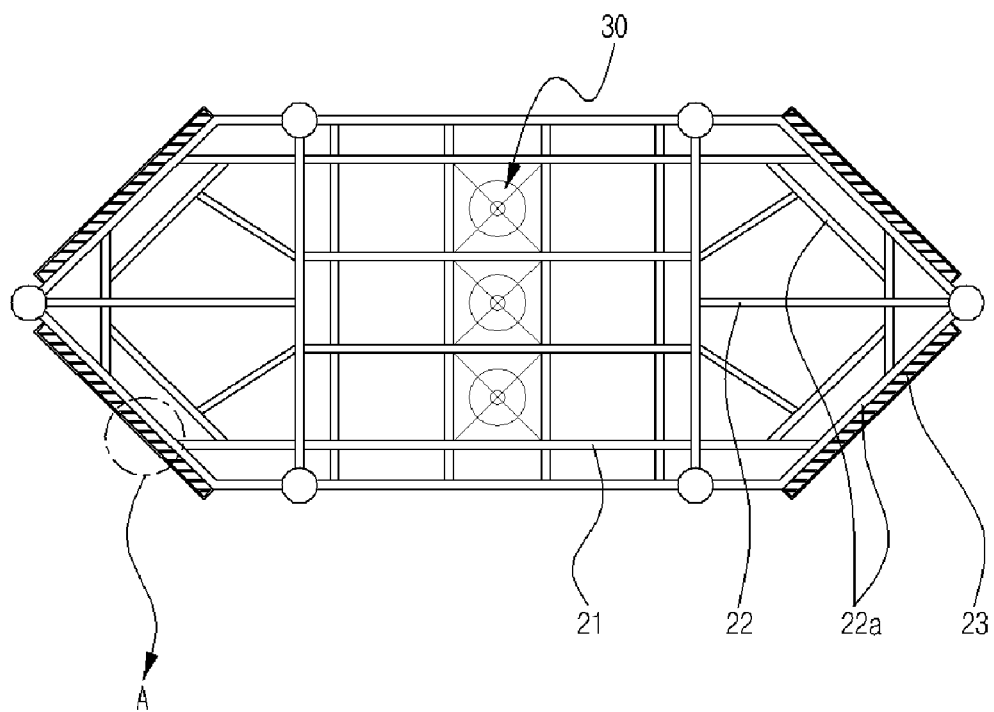
[Fig. 6]
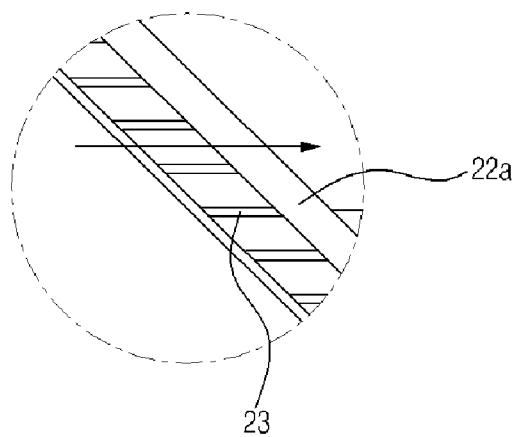

[Fig. 7]
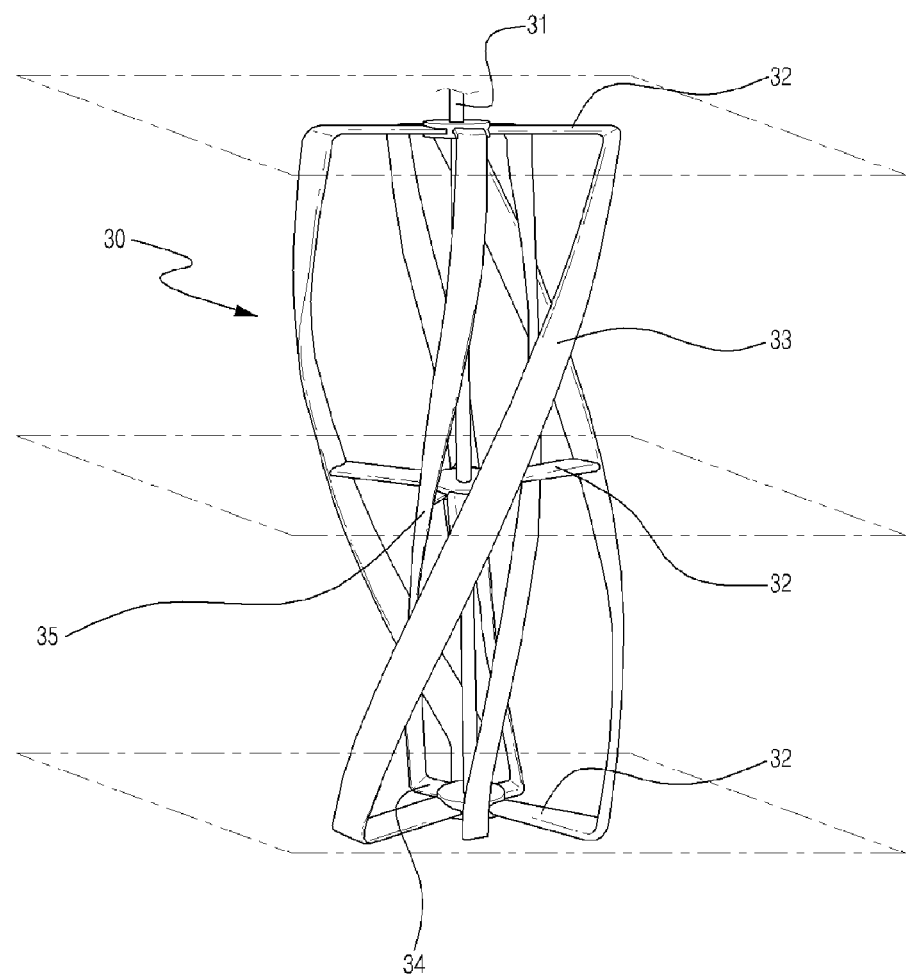
[Fig. 8]
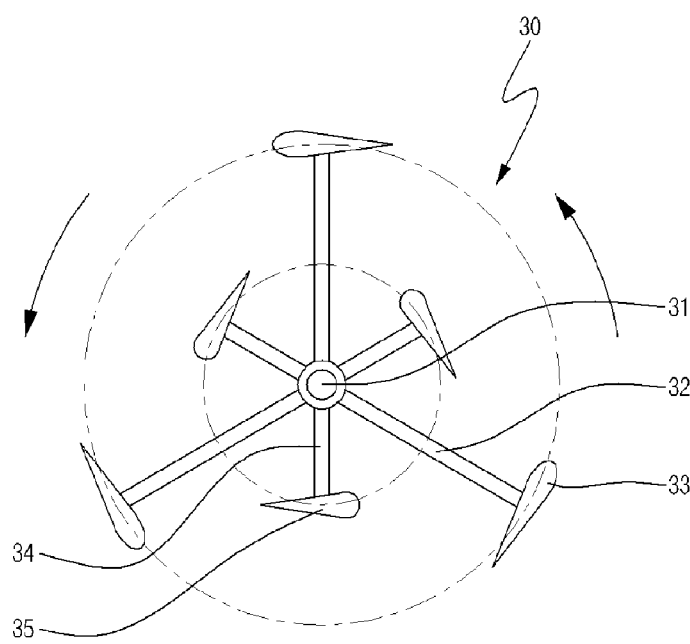

POWER GENERATION SYSTEM USING HELICAL TURBINE

CROSS-REFERENCES TO RELATED APPLICATIONS

This application is a U.S. national phase application, pursuant to 35 U.S.C. §371, of PCT/KR2007/006036, filed Nov. 27, 2007, designating the United States, which claims priority to Korean Application No. 10-2006-0118645, filed Nov. 28, 2006. The entire contents of the aforementioned patent applications are incorporated herein by this reference.

TECHNICAL FIELD

The present invention relates to a power generation system using a helical turbine, and more particularly to a helical turbine power generation system, in which kinetic energy of a helical turbine obtaining a rotation force by tidal water flow energy can be converted into electrical energy by using a synchronous generator, and a fluid coupling is used to prevent overload of the synchronous generator.

BACKGROUND ART

In general, a turbine refers to a machine or an apparatus for converting energy included in fluids (such as, water, gas, steam, etc.) into useful mechanical work. A system for generating tidal energy by using such a turbine is tidal power generation.

In conventional tidal power generation, a tidal power dam is built on a back bay of a high tidal range in order to block the movement of sea water, and then the difference of water level between inside and outside of the tidal power dam, which is generated by a tidal range, is used to generate electricity. This mechanism of the tidal power generation is similar to that of hydroelectric power generation.

However, the conventional tidal power generation uses potential energy, and thus, requires a water level above a certain height. Therefore, it is necessary to build a seawall causing environmental pollution problems including sea water pollution.

In addition, the construction of such a sea wall requires a long construction period, and accordingly high construction costs.

DISCLOSURE OF INVENTION

Technical Problem

Therefore, the present invention has been made in view of the above-mentioned problems, and the present invention provides a helical turbine power generation system for generating electricity by a helical turbine obtaining a rotation force under unidirectional or multidirectional fluid flow.

Also, the present invention provides a helical turbine power generation system for preventing overload of a synchronous generator at a high rate of fluid flow, by a fluid coupling.

Technical Solution

In accordance with an aspect of the present invention, there is provided a helical turbine power generation system, the system including: a helical turbine rotatably provided in a frame so as to continuously generate rotation force under unidirectional or multidirectional fluid flow; a step-up gear for increasing a rotational velocity of the helical turbine up to a level required for generating electricity; a fluid coupling for preventing the rotational velocity increased by the step-up gear from increasing above a required velocity at a temporarily high rate of fluid flow; and a synchronous generator for generating electricity by using the rotational velocity transferred from the fluid coupling. Accordingly, it is possible to convert rotational motion generated by the helical turbine into electrical energy.

ADVANTAGEOUS EFFECTS

A helical turbine power generation system according to the present invention includes a helical turbine for generating rotation force, and thus does not require a tidal power dam used for a conventional structure. Accordingly, it is possible to reduce construction costs, and at the same time to prevent environmental pollution.

*Also, a synchronous generator used for generating electricity reduces equipment costs, and a fluid coupling prevents overload of the synchronous generator. Therefore, it is possible to improve the functionality of the system.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a schematic block diagram illustrating a helical turbine power generation system according to a first embodiment of the present invention;

FIG. 2 is a cross-sectional view of a construction for installing the helical turbine shown in FIG. 1;

FIG. 3 is a perspective view illustrating the helical turbine shown in FIG. 2;

FIG. 4 is a cross-sectional view illustrating the helical turbine shown in FIG. 3;

FIG. 5 is a plane view illustrating the frame shown in FIG. 2;

FIG. 6 is a partially enlarged cross-sectional view illustrating "A" shown in FIG. 5;

FIG. 7 is a perspective view illustrating a helical turbine in a helical turbine power generation system according to a second embodiment of the present invention; and FIG. 8 is a cross-sectional view illustrating the helical turbine shown in FIG. 7.

MODE FOR THE INVENTION

Hereinafter, a power generation system using a helical turbine according to a first embodiment of the present invention will be described with reference to the accompanying drawings.

FIG. 1 is a schematic block diagram illustrating a helical turbine power generation system according to a first embodiment of the present invention; FIG. 2 is a cross-sectional view of a construction for installing the helical turbine shown in FIG. 1; FIG. 3 is a perspective view illustrating the helical turbine shown in FIG. 2; FIG. 4 is a cross-sectional view illustrating the helical turbine shown in FIG. 3; FIG. 5 is a plane view illustrating the frame shown in FIG. 2; FIG. 6 is a partially enlarged cross-sectional view illustrating "A" shown in FIG. 5.

As shown in the drawings, a helical turbine power generation system according to a first embodiment of the present invention includes: a helical turbine 30 rotatably provided in a frame 20 provided in fluid; a step-up gear 6 for increasing a rotational velocity of the helical turbine 30 up to a level required for generating electricity; a fluid coupling 5 for preventing the rotational velocity from increasing above a required velocity, the fluid coupling being connected to the step-up gear 6; a synchronous generator 4 for generating electricity, the generator being connected to the fluid coupling 5; a power converter 3 for converting the generated electricity into electricity with a constant voltage and constant frequency, the converter being electrically connected to the synchronous generator 4; a transformer 2 for changing voltage or current, the transformer being connected to the power converter 3; and a system inter-connection unit 1 for linking the electricity coming from the transformer 2 to a conventional power system.

The helical turbine 30 includes: a shaft 31 rotatably supported by a frame 20; a plurality of supporting members 32 radially protruding from the shaft 31, in which a series of the supporting members are arranged in layers; and at least one blade 33 having a helical structure, in which the blade is connected to the ends of the multilayered respective supporting members 32, has a streamlined cross section, and twists in a longitudinal direction of the shaft 31.

The frame 20 includes: a fixing member 21 of a rectangular frame shape, which contains the helical turbine 30 and rotatably supports the rotation shaft 31; and a protruding member 22 including triangular frames on both sides in contact with fluid flow. On both protruding sloping sides 22a of the protruding member 22, a plurality of slits 23 parallel to the direction of the fluid flow are formed with equal spacing.

The process of operating a helical turbine power generation system as described above is as follows.

When fluid flows at a certain velocity, the helical turbine 30 rotates by the streamlined blade 33 of a helical structure. Herein, floating matter included in the fluid is filtered without passing through the slits 23. Also, since the middle portion of the protruding member 22 protrudes toward a direction of the fluid flow, the floating matter is caught on both sloping sides 22a without disturbing the fluid flow, and then is pushed to the ends of the sloping sides 22a by the fluid flow.

When rotation by the rotation shaft 31 (to which the blade 33 is fixed) is transferred to the step-up gear 6, the step-up gear 6 increases a rotational velocity of the rotation shaft 31 up to a level required for generating electricity. The rotational velocity increased by the step-up gear 6 is transferred to the fluid coupling 5. The fluid coupling 5 prevents the rotational velocity increased by the step-up gear 6 and received by the synchronous generator 4 from increasing above a certain velocity, and thus prevents overload of the synchronous generator 4.

The rotation force transferred to the synchronous generator 4 from the fluid coupling 5 is converted into electrical energy, thereby generating electricity, and the generated electricity is converted into high quality electricity with a constant voltage and constant frequency through the power converter 3. Also, through the transformer 2, voltage or current of the electricity is converted, and then the electricity coming from the transformer 2 is linked to a conventional power system by a system interconnection unit 1.

In addition to the helical turbine 30 as described above, as shown in FIGS. 7 and 8, a helical turbine power generation system according to a second embodiment of the present invention further includes: a plurality of additional supporting members 34 radially protruding from the shaft 31, in which the additional supporting members 34 are shorter than the supporting members 32, alternate with the supporting members 32, and are multilayered in series; and at least one additional blade 35 having a helical structure, in which the blade is connected to the ends of the additional supporting members 34, has a streamlined cross section, and twists in a longitudinal direction of the shaft 31.

Accordingly, a helical turbine power generation system according to the second embodiment of the present invention, which additionally includes the supporting members 34 and the blade 35 provided in the helical turbine 30, can achieve a big rotation force according to fluid flow. Therefore, the present invention can improve rotation efficiency of a helical turbine power generation system.

*As described above, in a helical turbine power generation system according to the present invention, the helical turbine 30 obtains a rotation force by fluid flow, and drives the synchronous generator 4, thereby generating electricity. Therefore, it is possible to reduce equipment costs. Also, the fluid coupling 5 mounted on the system prevents overload of the synchronous generator 4.

In addition, the step-up gear 6 mounted on the system makes it possible to generate a rotational velocity up to a level required for generating electricity, even at a low rate of fluid flow.

Industrial Applicability

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A helical turbine power generation system, the system comprising:
   a helical turbine rotatably provided in a frame and configured to continuously generate rotational force under unidirectional or multidirectional fluid flow;
   a step-up gear rotatably connected to the helical turbine and configured to increase a rotational velocity of the helical turbine up to a level required for generating electricity;
   a fluid coupling rotatably connected to the step-up gear and configured to prevent the rotational velocity increased by the step-up gear and delivered by the fluid coupling from increasing above a required velocity at a high rate of the fluid flow;
   a synchronous generator rotatably connected to the fluid coupling and configured to generate electricity by using the rotational velocity transferred from the fluid coupling, wherein the fluid coupling is disposed between the step-up gear and the synchronous generator;
   a fixing member incorporated into a rectangular-shaped frame, in which the helical turbine is fixed;
   a protruding member having triangular frames on both sides in contact with the fluid flow; and
   a plurality of slits parallel to a direction of the fluid flow, which are formed on both protruding sloping sides of the protruding member, wherein floating matter included in the fluid is filtered out so that the floating matter does not pass through the plurality of slits with the fluid and wherein protruding member prevents the floating matter from disturbing fluid flow through the slits.

2. The system as claimed in claim 1, wherein the helical turbine comprises: a shaft rotatably supported by the frame; a plurality of supporting members radially protruding from the shaft, in which a series of the supporting members are multilayered; and at least one blade having a helical structure, in which the blade is connected to ends of the supporting members, has a streamlined cross section, and twists in a longitudinal direction of the shaft.

3. The system as claimed in claim 2, wherein the helical turbine further comprises: a plurality of additional supporting members radially protruding from the shaft, in which the additional supporting members are shorter than the supporting members, alternate with the supporting members, and are multilayered in series; and at least one additional blade having a helical structure, in which the additional blade is connected to ends of the additional supporting members, has a streamlined cross section, and twists in a longitudinal direction of the shaft.

4. The system as claimed in claim 1, wherein the synchronous generator further comprises: a power converter for converting the electricity generated by the synchronous generator into high quality electricity with a constant voltage and constant frequency; a transformer for changing voltage or current; and a system interconnection unit for linking the generated electricity with a conventional power system.

5. The system as claimed in one of claims 1 to 3, wherein the synchronous generator further comprises: a power converter for converting the electricity generated by the synchronous generator into high quality electricity with a constant voltage and constant frequency; a transformer for changing voltage or current; and a system interconnection unit for linking the generated electricity with a conventional power system.

* * * * *